J. N. GRIMES.
WATER ELEVATING DEVICE.
APPLICATION FILED SEPT. 17, 1913.
1,142,089.
Patented June 8, 1915.
2 SHEETS—SHEET 1.
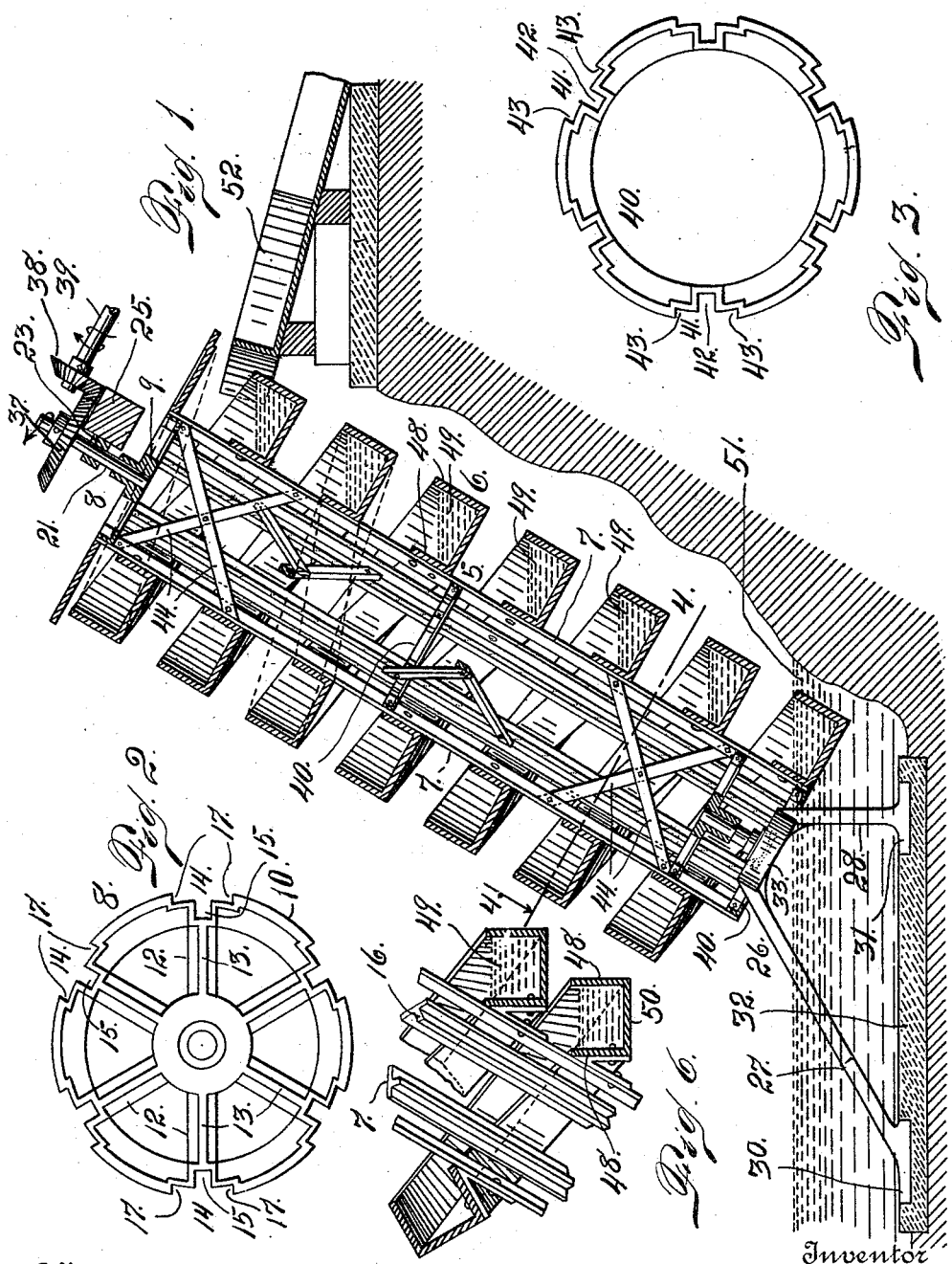
Witnesses
Otto E. Hoddick.
L. E. Petersen.
Inventor
Joseph N. Grimes.
By
Attorney

J. N. GRIMES.
WATER ELEVATING DEVICE.
APPLICATION FILED SEPT. 17, 1913.

1,142,089.

Patented June 8, 1915.
2 SHEETS—SHEET 2.

Witnesses
Otto E. Hoddick.
L. E. Petersen.

Inventor
Joseph N. Grimes.
By A. J. O'Brien
Attorney

THE NORRIS PETERS CO., PHOTO-LITHO., WASHINGTON, D. C.

UNITED STATES PATENT OFFICE.

JOSEPH NEWTON GRIMES, OF DENVER, COLORADO.

WATER-ELEVATING DEVICE.

1,142,089.   Specification of Letters Patent.   Patented June 8, 1915.

Application filed September 17, 1913. Serial No. 790,231.

*To all whom it may concern:*

Be it known that I, JOSEPH NEWTON GRIMES, a citizen of the United States, residing in the city and county of Denver and State of Colorado, have invented certain new and useful Improvements in Water-Elevating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in water elevating devices.

In my improved construction, the apparatus consists of a central frame around which is spirally arranged a trough, the axis of the structure being inclined to the horizontal during the rotary action of the apparatus when in use. This is a novel construction of raising water on the Archimedean screw principle.

The spirally arranged trough may have its walls either parallel or standing at an angle to the axis of the structure. The convolutions of the spiral will hold the largest quantity of water when the walls of the trough are arranged at such an angle to the axis of the device that the water is at equal height with reference to the two opposite side walls of the spiral at the parts of the latter which are lowermost in the several convolutions of the structure.

Having briefly outlined my improved construction, I will proceed to describe the same in detail, reference being made to the accompanying drawing, in which is illustrated an embodiment thereof.

Figure 4:
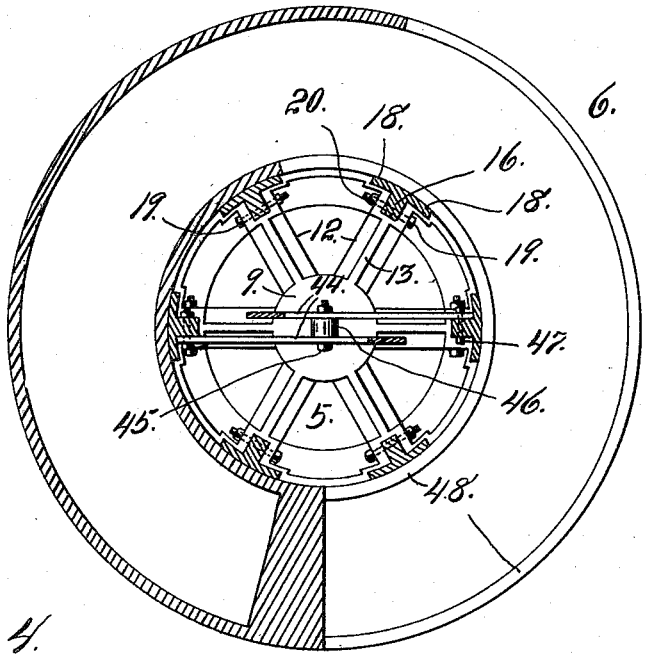
Figure 5:
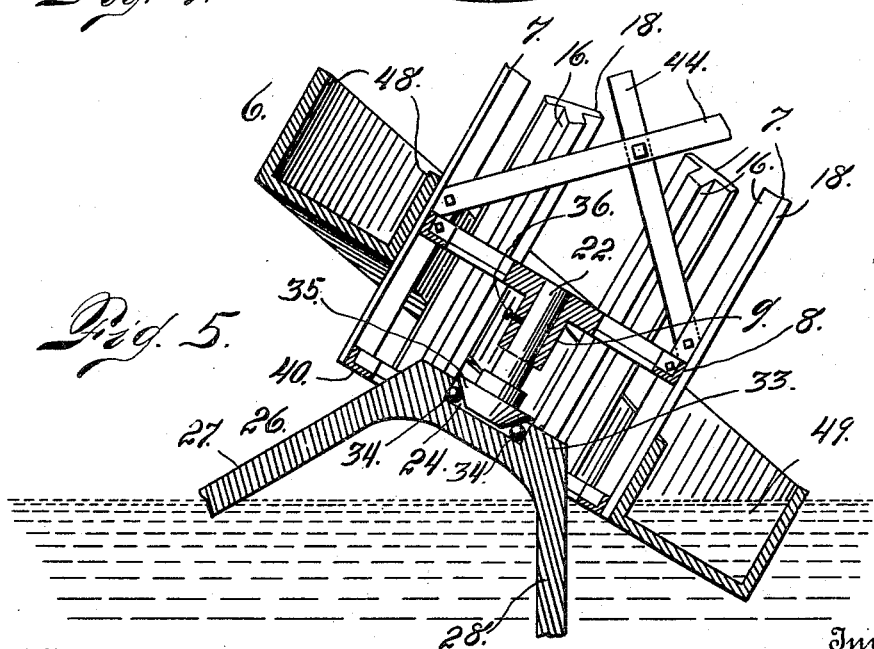

In this drawing—Figure 1 is a central longitudinal section taken through my improved water elevating device, showing the same in position for use. Fig. 2 is a top plan view illustrating a spider member forming a part of the central framework and arranged at opposite ends of the structure, the same being shown on a larger scale than in Fig. 1. Fig. 3 is a similar view of a ring also forming a part of the interior framework, the same being shown on the same scale as Fig. 2. Fig. 4 is a cross section taken through the device at right angles to the axis, being a section taken on the line 4—4, Fig. 1, but shown on a larger scale. Fig. 5 is a fragmentary view of the lower part of the structure similar to Fig. 1, but shown on a larger scale. Fig. 6 is a fragmentary view showing a modified form of construction.

The same reference characters indicate the same parts in all the views.

Let the numeral 5 designate a cylindrical skeleton framework, and 6 a trough extending spirally around the same. This structure is mounted to rotate on a longitudinal axis occupying a position at an angle to the horizontal, whereby as the rotary action of the apparatus ceases, there will be a predetermined quantity of water retained within the lower portions of the various convolutions, which water can be removed therefrom after the forward or normal rotation of the structure has ceased, by the reverse movement of the same, only.

The central skeleton framework of the device is composed of a number of T-bars 7, which are secured to spiders 8 arranged as illustrated in the drawing at the upper and lower portions of the structure. Each of these spiders has a hub 9 connected with the rim 10 by spider arms 12, the said arms having tongues or webs 13 for strengthening purposes. In the peripheries of these spiders are formed recesses 14 having portions 15 adapted to receive the tongues 16 of the T-bars 7, while the portions 17 of these recesses are adapted to receive the flanges 18 of the T-bars. The latter are secured to the spiders by means of bolts 19 passed through the outer extremities of the spider arms and the tongues 16 of the T-bars, the connected parts being provided with registering openings for the purpose. These bolts are secured in place by nuts 20. The hubs 9 of these spiders are secured to short shafts 21 and 22, which are respectively received by a box 23 and a cavity 24, the former being made fast to a stationary support 25 at the top of the structure and the latter being formed in a stationary supporting bracket 26 at the lower extremity of the structure, the said bracket being set into the bed of the stream, reservoir or other body of water from which the water is to be elevated for irrigating or other purposes. As illustrated in the drawing (see Fig. 1) this stationary support 26 includes legs 27 and 28, whose lower extremities are expanded as shown at 30 and 31 and set into a concrete or cement base 32. These arms are connected at the top by a disk 33 in which the recess 24 is formed. This recess is adapted to receive ball bearings 34 which engage a cone 35 formed on the lower extremity of the shaft member 22. As shown in the drawing a set bolt 36 is employed to secure the hub 9 of the spider to the shaft 22.

The upper extremity of the shaft 21 above the journal box 23 is equipped with a gear 37 which meshes with a similar gear 38 formed on an operating shaft 39 connected with any suitable means for imparting rotary movement thereto.

The T-bars 7 of the central skeleton frame of the structure are further supported and maintained in their proper relation by means of rings 40 (see Fig. 3) these rings being provided with recesses 41 and having portions 42 adapted to receive the tongues 16 of the T-bars and portions 43 adapted to receive the flanges of the T-bars when the parts are assembled. As illustrated in the drawing (see Fig. 1) two of these rings 40 are employed. It is evident that any desired number may be used, according to the height or length of the apparatus.

In addition to the spiders 8 and the rings 40, the skeleton framework 5 of the structure is equipped with braces 44 arranged in pairs. The individual members of each pair occupy positions at right angles to each other and are connected at their intersection by means of bolts 45, spacers 46 being located between the members 44 and through which the bolts 45 also pass. The outer extremities of these braces are secured to the tongues 16 of the T-bars by suitable fastening devices as bolts 47. There may of course, be any desired number of these pairs of braces, so long as they are arranged in such a manner that they do not interfere with each other or with the rings 40 and spiders 8 of the structure.

In Fig. 1 the opposite walls 48 of the trough are parallel to the longitudinal axis of the structure and consequently the water 49 which collects in the lowest portions of the various convolutions of the structure occupies a higher position on the outer wall measured from the bottom of the trough than on the inner wall; while when the walls 48 of the trough occupy positions at suitable angles to the longitudinal axis of the structure, the water 49 occupying the lowest portions of the various convolutions of the structure, attains an equal height measured from the bottom 50 of the trough on both inner and outer walls thereof.

When the apparatus is in use for elevating water, it is rotated in the proper direction to cause the water to travel upwardly therein from the water source 51, and discharge at the top of the structure.

In Fig. 1 a stationary trough 52 is arranged to receive the water from the top of the spiral trough during the operation of the latter.

Having thus described my invention, what I claim is:

1. The combination of a frame composed of longitudinally disposed bars arranged to form a cylinder, spider members to which the bars are secured, and an open trough spirally arranged on the framework, the structure being journaled at top and bottom and suitably supported at an inclined position.

2. The combination of a framework composed of longitudinally disposed T-bars arranged in the form of a cylinder, a spider member having counterpart recesses to receive the T-bars, means for securing the T-bars to the spider members, and a trough spirally arranged on the framework, the structure being journaled at top and bottom in suitable supports and in an inclined position.

3. In a structure of the class described, the combination of a hollow skeleton framework composed of spider members and longitudinally disposed bars secured thereto, terminal shaft members secured to the spider members, stationary parts in which the shaft members are journaled at the top and bottom to cause the structure to assume an inclined position, a conduit spirally arranged on the said frame, and open at the top and bottom, and suitable means for rotating the structure, substantially as described.

4. In apparatus of the class described, the combination of a skeleton framework composed of T-bars, spider members and reinforcing rings, the T-bars being applied exteriorly to the spider members and rings which are equipped with counterpart recesses for the purpose, the tongues of the T-bars being innermost, a conduit spirally arranged exteriorly on the said frame and secured thereto, the said conduit being open at the bottom and top for inlet and discharge purposes, means for journaling the structure in an inclined position, and means for imparting the rotary movement thereto, substantially as described.

In testimony whereof I affix my signature in presence of two witnesses.

JOSEPH NEWTON GRIMES.

Witnesses:
 FREDERICK YEABEL,
 A. J. O'BRIEN.